(12) United States Patent
Fukuchi et al.

(10) Patent No.: US 11,641,116 B2
(45) Date of Patent: May 2, 2023

(54) CHARGE/DISCHARGE CONTROL CIRCUIT AND BATTERY DEVICE HAVING THE SAME

(71) Applicant: ABLIC Inc., Tokyo (JP)

(72) Inventors: Shinya Fukuchi, Tokyo (JP); Kazuaki Sano, Tokyo (JP)

(73) Assignee: ABLIC INC., Tokyo (JP)

( * ) Notice: Subject to any disclaimer, the term of this patent is extended or adjusted under 35 U.S.C. 154(b) by 175 days.

(21) Appl. No.: 17/162,024

(22) Filed: Jan. 29, 2021

(65) Prior Publication Data

US 2021/0242689 A1  Aug. 5, 2021

(30) Foreign Application Priority Data

Feb. 3, 2020 (JP) .............................. JP2020-016155

(51) Int. Cl.
*H02J 7/00* (2006.01)
*H01M 10/44* (2006.01)

(52) U.S. Cl.
CPC ......... *H02J 7/0014* (2013.01); *H01M 10/441* (2013.01); *H02J 7/0047* (2013.01); *H02J 7/00712* (2020.01)

(58) Field of Classification Search
CPC ...... H02J 7/0014; H02J 7/00712; H02J 7/007; H02J 7/00047; H01M 10/441; H01M 10/44

See application file for complete search history.

(56) References Cited

U.S. PATENT DOCUMENTS

| 9,142,981 | B2* | 9/2015 | Kamata | B60L 58/22 |
| 10,594,146 | B2* | 3/2020 | Shibata | H02J 7/0036 |
| 2013/0241471 | A1 | 9/2013 | Arai et al. | |
| 2019/0036358 | A1* | 1/2019 | Liang | H02J 7/0024 |
| 2022/0205305 | A1* | 6/2022 | Zhang | H02M 3/155 |

FOREIGN PATENT DOCUMENTS

JP  2013-192394 A  9/2013

* cited by examiner

*Primary Examiner* — Richard Isla
*Assistant Examiner* — Sadia Kousar
(74) *Attorney, Agent, or Firm* — Crowell & Moring LLP

(57) ABSTRACT

A charge/discharge control circuit includes: an output terminal from which a cell-balance control signal is sent to each of the first and the second cell balance circuits; the first and the second voltage detection circuits; a control circuit configured to send the first and the second control signals in accordance with a detection signal received from at least one of the first and the second voltage detection circuits; and an output circuit configured to select one of a voltage of a power supply terminal, a voltage of an input terminal connected to each of a negative electrode of a first battery and a positive electrode of a second battery, and a voltage of a ground terminal in accordance with the first and second control signals, and send the selected voltage to the output terminal.

6 Claims, 3 Drawing Sheets

CHARGE/DISCHARGE CONTROL CIRCUIT AND BATTERY DEVICE HAVING THE SAME

RELATED APPLICATIONS

This application claims priority to Japanese Patent Application No. 2020-016155, filed Feb. 3, 2020, the entire content of which is incorporated herein by reference.

BACKGROUND OF THE INVENTION

1. Field of the Invention

The present invention relates to a charge/discharge control circuit and a battery device.

2. Description of the Related Art

FIG. 3 is a circuit diagram for illustrating a conventional battery device having a cell balance circuit.

The conventional battery device has a charge/discharge control circuit 30, batteries 31a and 31b, resistors 32a and 32b for cell-balance discharging, Nch FETs 33a and 33b for cell-balance discharging, protection resistors 34a and 34b, a discharge control FET 35, a charge control FET 36, and external terminals EB+ and EB−. The charge/discharge control circuit 30 has overcharge detection circuits 301a and 301b, overdischarge detection circuits 302a and 302b, cell-balance detection circuits 303a and 303b, a control circuit 304, a power supply terminal VDD, a ground terminal VSS, an input terminal VC, and output terminals CB1, CB2, CO, and DO.

The charge/discharge control circuit 30 monitors voltages of the batteries 31a and 31b, and controls the voltages of the batteries 31a and 31b through turning on/off the discharge control FET 35 and the charge control FET 36 by the control circuit 304 based on the condition of the voltages.

Connection of a charger between the external terminals EB+ and EB− starts charging of the batteries 31a and 31b so that voltages of the power supply terminal VDD and the input terminal VC gradually increase. In a state in which the voltage of one of the batteries, for example, the voltage of the battery 31a, that is, the VDD-VC voltage, exceeds the cell-balance detection voltage, the cell-balance detection circuit 303a sends a detection signal to the control circuit 304. In response to the reception of the detection signal from the cell-balance detection circuit 303a, the control circuit 304 sends a cell-balance control signal to the Nch FET 33a. In response to the reception of the cell-balance control signal, the Nch FET 33a for cell-balance discharging turns on to discharge the battery 31a. Consequently, the charging speed of the battery 31a is reduced compared to the battery 31b.

Likewise, in a state in which the voltage of the battery 31b exceeds the cell-balance detection voltage, the control circuit 304 turns on the Nch FET 33b for cell-balance discharging to discharge the battery 31b.

Through the above-mentioned charging operation, the charge/discharge control circuit 30 eliminates voltage deviation between the batteries 31a and 31b, that is, performs cell balance operation (see, for example, Japanese Patent Application Laid-open No. 2013-192394).

As a conceivable measure for responding to a demand for reducing cost for the charge/discharge control circuit 30, reduction of the number of terminals thereof may be considered. However, with the conventional circuit configuration, it is difficult to omit any more terminals.

SUMMARY OF THE INVENTION

It is an object of the present invention to reduce the cost for a charge/discharge control circuit and a battery device.

A charge/discharge control circuit according to an embodiment of the present invention includes: a power supply terminal to which a positive electrode of a first battery is connected; an input terminal to which a negative electrode of the first battery and a positive electrode of a second battery are connected; a ground terminal to which a negative electrode of the second battery is connected; an output terminal configured to send a cell-balance control signal to each of a first cell balance circuit and a second cell balance circuit; a first voltage detection circuit connected between the power supply terminal and the input terminal; a second voltage detection circuit connected between the input terminal and the ground terminal; a control circuit configured to send a first control signal and a second control signal in accordance with a detection signal provided from at least one of the first voltage detection circuit and the second voltage detection circuit; and an output circuit configured to send a selected voltage to the output terminal, the selected voltage being selected from one of a voltage of the power supply terminal, a voltage of the input terminal, and a voltage of the ground terminal in accordance with the first control signal and the second control signal.

According to a charge/discharge control circuit of the present invention, the number of output terminals for controlling the cell-balance discharging FETs connected in parallel to the two series-connected batteries, respectively, can be reduced to one. As a result, the cost for the charge/discharge control circuit and the battery device can be reduced.

DETAILED DESCRIPTION OF THE PREFERRED EMBODIMENTS

Figure 1:
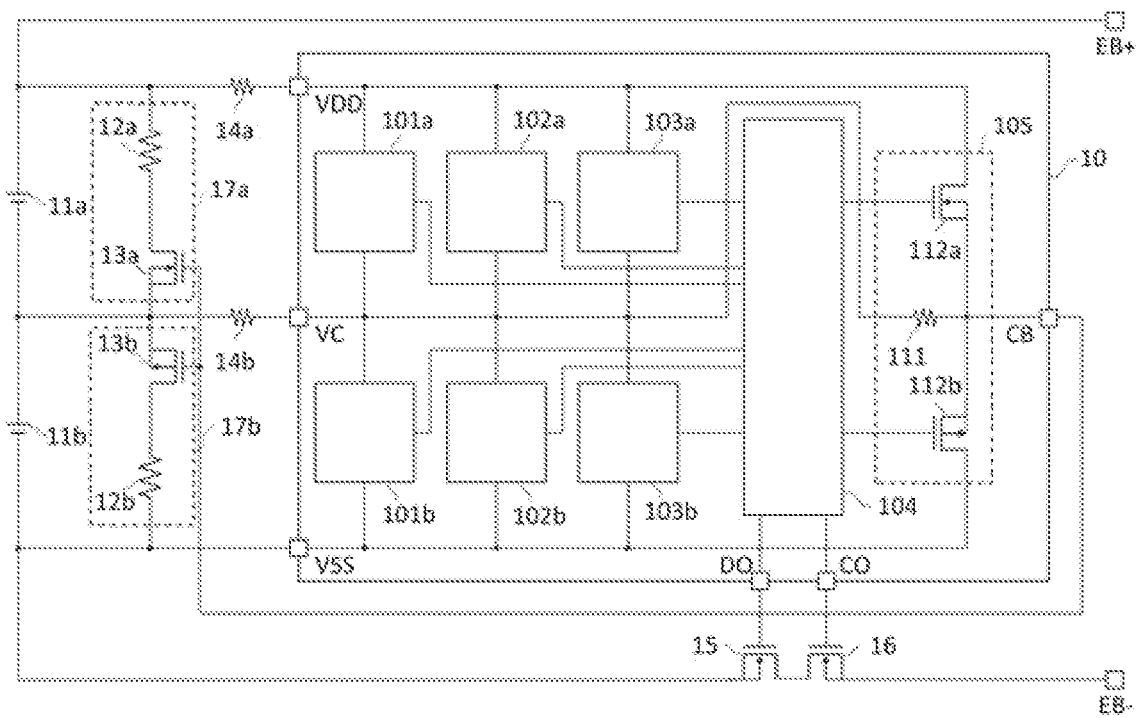
FIG. 1 is a circuit diagram for illustrating a battery device including a charge/discharge control circuit according to an embodiment of the present invention.

FIG. 1 is a circuit diagram for illustrating a battery device including a charge/discharge control circuit according to the embodiment of the present invention.

The battery device includes a charge/discharge control circuit 10, batteries 11a and 11b, resistors 12a and 12b for cell-balance discharging, an Nch FET 13a and Pch FET 13b for cell-balance discharging, protection resistors 14a and 14b, a discharge control FET 15, a charge control FET 16, and external terminals EB+ and EB−. The resistor 12a and the Nch FET 13a form a first cell balance circuit 17a, and the resistor 12b and the Pch FET 13b form a second cell balance circuit 17b. The charge/discharge control circuit 10 includes a power supply terminal VDD, a ground terminal VSS, an input terminal VC, and output terminals CB, DO, and CO.

The battery 11a has a positive terminal connected to the external terminal EB+ and to the power supply terminal VDD via the protection resistor 14a, and has a negative terminal connected to a positive terminal of the battery 11b and to the input terminal VC via the protection resistor 14b. The battery 11b has a negative terminal connected to the ground terminal VSS. The Nch FET 13a has a drain connected to the positive terminal of the battery 11a via the resistor 12a, a source connected to the negative terminal of the battery 11a and to the positive terminal of the battery 11b, and a gate connected to the output terminal CB. The Pch FET 13b has a source connected to the negative terminal of the battery 11a and to the positive terminal of the battery 11b, a drain connected to the negative terminal of the battery 11b via the resistor 12b, and a gate connected to the output terminal CB. The discharge control FET 15 has a drain connected to a drain of the charge control FET 16, a source connected to the negative terminal of the battery 11b, and a gate connected to the output terminal DO. The charge control FET 16 has a source connected to the external terminal EB− and a gate connected to the output terminal CO.

The charge/discharge control circuit 10 includes overcharge detection circuits 101a and 101b, overdischarge detection circuits 102a and 102b, cell-balance detection circuits 103a and 103b, a control circuit 104, and an output circuit 105. Detection voltages of the respective detection circuits satisfy a relation VOD<VCB<VOC where VOD is an overdischarge detection voltage, VCB is a cell-balance detection voltage, and VOC is an overcharge detection voltage. The output circuit 105 includes a current limiting resistor 111, a switch 112a constructed by an Nch FET, and a switch 112b constructed by a Pch FET.

The overcharge detection circuit 101a, the overdischarge detection circuit 102a, and the cell-balance detection circuit 103a are connected between the power supply terminal VDD and the input terminal VC while respective output terminals are connected to a first input terminal, second input terminal, and third input terminal of the control circuit 104, respectively. The overcharge detection circuit 101b, the overdischarge detection circuit 102b, and the cell-balance detection circuit 103b are connected between the input terminal VC and the ground terminal VSS. Output terminals of the overcharge detection circuit 101b, the overdischarge detection circuit 102b, and the cell-balance detection circuit 103b are connected to a fourth input terminal, fifth input terminal, and sixth input terminal of the control circuit 104, respectively.

The control circuit 104 has a first output terminal connected to a control terminal of the switch 112a, has a second output terminal connected to a control terminal of the switch 112b, has a third output terminal connected to the output terminal DO, and has a fourth output terminal connected to the output terminal CO.

The output circuit 105 has a first input terminal connected to the power supply terminal VDD, a second input terminal connected to the ground terminal VSS, a third input terminal connected to the input terminal VC, and an output terminal connected to the output terminal CB. The switch 112a is connected between the first input terminal and the output terminal. The switch 112b is connected between the output terminal and the second input terminal. The current limiting resistor 111 is connected between the third input terminal and the output terminal.

Operation of the battery device constructed as above is then described below.

The batteries 11a and 11b whose voltages are reduced through discharging to a load are charged by a charger connected between the external terminal EB+ and the external terminal EB−. In a case in which voltages of the battery 11a and the battery 11b are lower than the cell-balance detection voltage, the overcharge detection circuits 101a and 101b, the overdischarge detection circuits 102a and 102b, and the cell-balance detection circuits 103a and 103b each send no detection signal to the control circuit 104.

The control circuit 104 receives no detection signal from any of the detection circuits, and hence the control circuit 104 sends a control signal for turning off the switches 112a and 112b from the first and second output terminals, respectively, sends a control signal for turning on the discharge control FET 15 from the third output terminal, and sends a control signal for turning on the charge control FET 16 from the fourth output terminal. The switches 112a and 112b are turned off, and hence the output circuit 105 applies the voltage of the input terminal VC to the output terminal CB. The Nch FET 13a and the Pch FET 13b are turned off because the gate voltage is equal to the source voltage.

Next, description is given of operation of the charge/discharge control circuit 10 in a case in which the voltage of the battery 11a exceeds the cell-balance detection voltage, and the voltage of the battery 11b does not exceed the cell-balance detection voltage.

In the case in which the voltage of the battery 11a exceeds the cell-balance detection voltage, the cell-balance detection circuit 103a sends a cell-balance detection signal to the third input terminal of the control circuit 104. Receiving the cell-balance detection signal at the third input terminal, the control circuit 104 sends a control signal for turning on the switch 112a from the first output terminal and sends a control signal for turning off the switch 112b from the second output terminal. Consequently, in the output circuit 105, the switch 112a is turned on and the switch 112b is turned off. Thus, the output circuit 105 applies a voltage of the power supply terminal VDD to the output terminal CB.

The Nch FET 13a is turned on because the voltage of the power supply terminal VDD is applied to the gate. As a result, the cell-balance discharging current flows through the resistor 12a and the Nch FET 13a. Thus, voltage increase of the battery 11a caused by the charging current is suppressed. The Pch FET 13b is turned off because the voltage of the power supply terminal VDD is applied to the gate. As a result, no cell-balance discharging current flows through the Pch FET 13b.

Through the above-mentioned operation of the charge/discharge control circuit 10, voltages of cells, namely, the battery 11a and the battery 11b, can be balanced.

Next, description is given of operation of the charge/discharge control circuit 10 in a case in which the voltage of the battery 11b exceeds the cell-balance detection voltage, and the voltage of the battery 11a does not exceed the cell-balance detection voltage.

In the case in which the voltage of the battery 11b exceeds the cell-balance detection voltage, the cell-balance detection circuit 103b sends a cell-balance detection signal to the sixth input terminal of the control circuit 104. Receiving the cell-balance detection signal at the sixth input terminal, the control circuit 104 sends a control signal for turning off the switch 112a from the first output terminal and sends a control signal for turning on the switch 112b from the second output terminal. Consequently, in the output circuit 105, the switch 112a is turned off and the switch 112b is turned on. Thus, the output circuit 105 applies the voltage of the ground terminal VSS to the output terminal CB.

The Pch FET 13b is turned on because the voltage of the ground terminal VSS is applied to the gate. As a result, a cell-balance discharging current flows through the Pch FET 13b and the resistor 12b. Thus, voltage increase of the battery 11b caused by a charging current is suppressed. The Nch FET 13a is turned off because the voltage of the ground terminal VSS is applied to the gate. As a result, no cell-balance discharging current flows through the Nch FET 13a.

Through the above-mentioned operation of the charge/discharge control circuit 10, voltages of cells, namely, the battery 11a and the battery 11b, can be balanced.

Next, description is given of operation of the charge/discharge control circuit 10 in a case in which the voltages of the battery 11a and the battery 11b exceed the cell-balance detection voltage.

In the case in which the voltages of the batteries 11a and 11b exceed the cell-balance detection voltage, the cell-balance detection circuit 103a sends a cell-balance detection signal to the third input terminal of the control circuit 104, and the cell-balance detection circuit 103b sends a cell-balance detection signal to the sixth input terminal of the control circuit 104. Receiving the cell-balance detection signals at both of the third input terminal and the sixth input terminal, the control circuit 104 sends a control signal for turning off the switch 112a from the first output terminal, and sends a control signal for turning off the switch 112b from the second output terminal. Because the switch 112a and the switch 112b are turned off, the output circuit 105 applies the voltage of the input terminal VC to the output terminal CB.

The Nch FET 13a is turned off because the voltage of the input terminal VC is applied to the gate. The Pch FET 13b is turned off because the voltage of the input terminal VC is applied to the gate. That is, in a case in which the voltages of both the batteries 11a and 11b exceed the cell-balance detection voltage, the control circuit 104 considers that the cells are balanced and causes no cell-balance discharging current to flow.

As described above, according to the charge/discharge control circuit according to the embodiment of the present invention, because three levels of output voltages can be applied from one output terminal to control the cell-balance discharging FETs connected in parallel to the two batteries, respectively, one output terminal can be omitted. That is, the cost for the charge/discharge control circuit and the battery device can be reduced.

Figure 2:
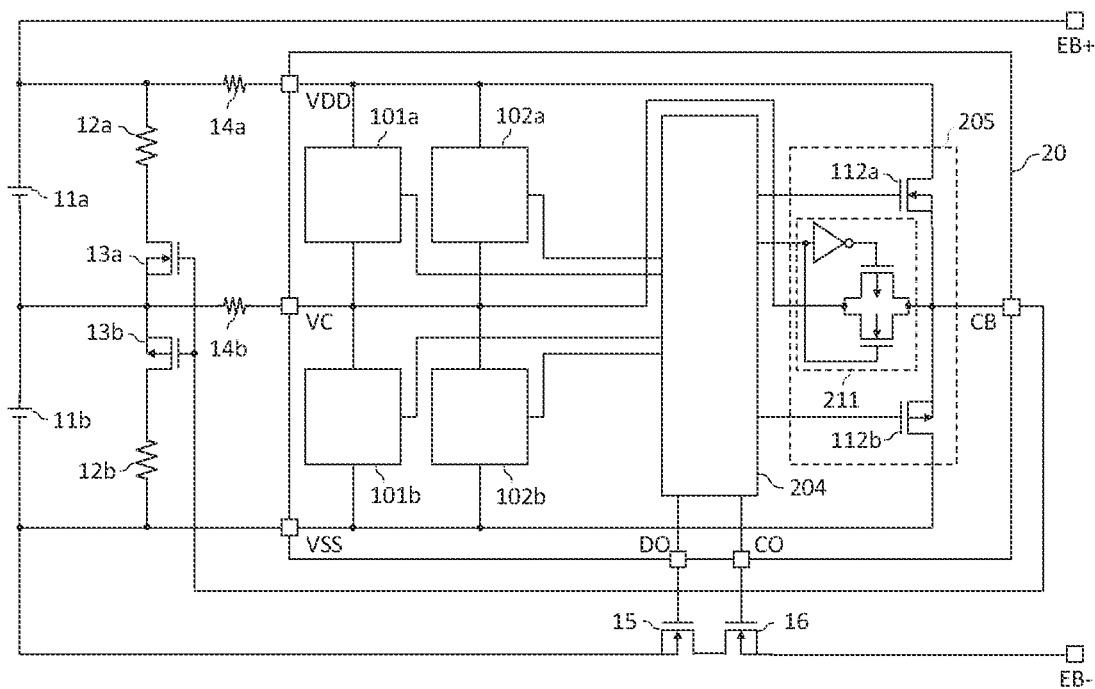
FIG. 2 is a circuit diagram for illustrating another example of the charge/discharge control circuit according to the embodiment of the present invention.
Figure 3:
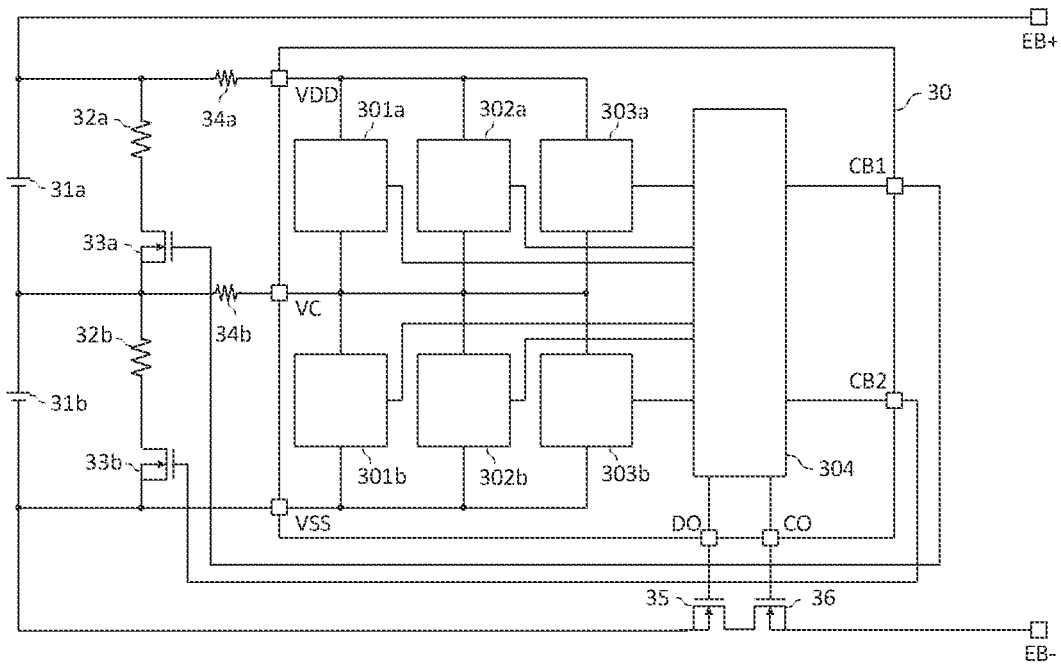
FIG. 3 is a circuit diagram for illustrating a conventional battery device.

FIG. 2 is a circuit diagram for illustrating another example of the charge/discharge control circuit according to the embodiment of the present invention.

A charge/discharge control circuit 20 shows an example in which the overcharge detection circuits 102a and 102b serve also as the cell-balance detection circuits 103a and 103b. In a case in which the cell-balance detection voltage and the overcharge detection voltage can be the same, the above-mentioned configuration is applicable.

Further, the output circuit 205 of the charge/discharge control circuit 20 includes a switching circuit 211 in place of the current limiting resistor 111. The switching circuit 211 is turned on/off in accordance with the control signal sent from the fifth output terminal of the control circuit 204. The switching circuit 211 is constructed by a transmission gate, for example. The switching circuit 211 is turned on in a case in which both the switch 112a and the switch 112b are turned off, to thereby apply the voltage of the input terminal VC to the output terminal CB.

The battery device of FIG. 2 can also produce the same effects as those of the battery device of FIG. 1 with the use of the charge/discharge control circuit 20 constructed as above.

The embodiment of the present invention has been described above, but the present invention is not limited to the above-mentioned embodiment, and various modifications can be made thereto without departing from the gist of the present invention.

In the embodiment of the present invention, the description is given of cell balancing against overcharging, for example, but the present invention is also applicable to cell balancing against overdischarging. In this case, in response to overdischarge cell-balance detection, a cell balance current is caused to flow through a battery having a voltage equal to or higher than an overdischarge cell-balance detection voltage. In this case, the overdischarge detection circuit may serve also as the cell-balance detection circuit.

Further, the switching circuit 211, for example, does not have to be the transmission gate and is not limited to the transmission gate as long as the operation as a switch capable of turning off the cell balance FET is secured.

What is claimed is:

1. A charge/discharge control circuit configured to control charging/discharging of a battery device having a first battery and a second battery connected in series; and a first cell balance circuit and a second cell balance circuit connected in parallel to the first battery and the second battery, respectively, the charge/discharge control circuit, comprising:
a power supply terminal to which a positive electrode of the first battery is connected;
an input terminal to which a negative electrode of the first battery and a positive electrode of the second battery is connected;
a ground terminal to which a negative electrode of the second battery is connected;
an output terminal configured to send a cell-balance control signal to each of the first cell balance circuit and the second cell balance circuit;
a first voltage detection circuit connected between the power supply terminal and the input terminal;
a second voltage detection circuit connected between the input terminal and the ground terminal;
a control circuit configured to send a first control signal and a second control signal in accordance with a detection signal provided from at least one of the first voltage detection circuit and the second voltage detection circuit; and
an output circuit configured to send a selected voltage to the output terminal, the selected voltage being selected from one of a voltage of the power supply terminal, a voltage of the input terminal, and a voltage of the ground terminal in accordance with the first control signal and second control signal.

2. The charge/discharge control circuit according to claim 1, wherein the output circuit comprises:
a first switch connected between the power supply terminal and the output terminal;
a second switch connected between the ground terminal and the output terminal; and
a current limiting resistor connected between the input terminal and the output terminal.

3. A battery device, comprising:
a first battery, a second battery, and charge/discharge control FETs connected in series between a first external terminal and a second external terminal;
a first cell balance circuit and a second cell balance circuit connected in parallel to the first battery and the second battery, respectively; and the charge/discharge control circuit of claim 2, the charge/discharge control circuit having the output terminal connected to a control terminal of each of the first cell balance circuit and the second cell balance circuit.

4. A battery device, comprising:
a first battery, a second battery, and charge/discharge control FETs connected in series between a first external terminal and a second external terminal;
a first cell balance circuit and a second cell balance circuit connected in parallel to the first battery and the second battery, respectively; and
the charge/discharge control circuit of claim 1, the charge/discharge control circuit having the output terminal connected to a control terminal of each of the first cell balance circuit and the second cell balance circuit.

5. A charge/discharge control circuit configured to control charging/discharging of a battery device having a first battery and a second battery connected in series; and a first cell balance circuit and a second cell balance circuit connected in parallel to the first battery and the second battery, respectively,
the charge/discharge control circuit, comprising:
a power supply terminal to which a positive electrode of the first battery is connected;
an input terminal to which a negative electrode of the first battery and a positive electrode of the second battery is connected;
a ground terminal to which a negative electrode of the second battery is connected;
an output terminal configured to send a cell-balance control signal to each of the first cell balance circuit and the second cell balance circuit;
a first voltage detection circuit connected between the power supply terminal and the input terminal;
a second voltage detection circuit connected between the input terminal and the ground terminal;
a control circuit configured to send a first control signal and a second control signal in accordance with a detection signal provided from at least one of the first voltage detection circuit and the second voltage detection circuit;
an output circuit configured to send a selected voltage to the output terminal, the selected voltage being selected from one of a voltage of the power supply terminal, a voltage of the input terminal, and a voltage of the ground terminal in accordance with the first control signal and second control signal; and
wherein the control circuit is configured to further send a third control signal in accordance with the detection signal provided from at least one of the first voltage detection circuit and the second voltage detection circuit, and
wherein the output circuit comprises:
a first switch connected between the power supply terminal and the output terminal;
a second switch connected between the ground terminal and the output terminal; and
a switching circuit connected between the input terminal and the output terminal, and controlled by the third control signal.

6. A battery device, comprising:
a first battery, a second battery, and charge/discharge control FETs connected in series between a first external terminal and a second external terminal;
a first cell balance circuit and a second cell balance circuit connected in parallel to the first battery and the second battery, respectively; and
the charge/discharge control circuit of claim 5, the charge/discharge control circuit having the output terminal connected to a control terminal of each of the first cell balance circuit and the second cell balance circuit.

* * * * *